United States Patent
Talbot

(10) Patent No.: US 10,531,041 B2
(45) Date of Patent: *Jan. 7, 2020

(54) METHOD AND SYSTEM FOR PROVIDING A VISUAL INDICATION THAT A VIDEO RELAY SERVICE CALL ORIGINATES FROM AN INMATE AT A CORRECTIONS FACILITY

(71) Applicant: Chris Talbot, Moorpark, CA (US)

(72) Inventor: Chris Talbot, Moorpark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,822

(22) Filed: Oct. 30, 2018

(65) Prior Publication Data

US 2019/0149766 A1   May 16, 2019

Related U.S. Application Data

(63) Continuation of application No. 15/795,183, filed on Oct. 26, 2017, now Pat. No. 10,129,505.

(60) Provisional application No. 62/413,972, filed on Oct. 27, 2016.

(51) Int. Cl.
| H04N 7/14 | (2006.01) |
| H04M 3/42 | (2006.01) |
| H04M 3/436 | (2006.01) |
| H04N 7/15 | (2006.01) |

(52) U.S. Cl.
CPC ........ *H04N 7/147* (2013.01); *H04M 3/42042* (2013.01); *H04M 3/42391* (2013.01); *H04M 3/436* (2013.01); *H04N 7/152* (2013.01); *H04M 2201/38* (2013.01); *H04M 2201/50* (2013.01); *H04N 7/155* (2013.01)

(58) Field of Classification Search
CPC ........ H04N 7/147; H04N 7/152; H04N 7/155; H04M 3/436; H04M 3/42042; H04M 3/42391; H04M 2201/50; H04M 2201/38
See application file for complete search history.

(56) References Cited

U.S. PATENT DOCUMENTS

| 5,382,972 A | 1/1995 | Kannes |
| 5,978,014 A | 11/1999 | Martin et al. |
| 7,046,779 B2 | 5/2006 | Hesse |
| 7,142,642 B2 | 11/2006 | McClelland et al. |
| 7,206,386 B2 | 4/2007 | Clapp et al. |
| 7,349,955 B1 | 3/2008 | Korb et al. |
| 7,573,985 B2 | 8/2009 | McClelland et al. |
| 7,746,984 B2 | 6/2010 | Nola et al. |
| 7,899,167 B1 | 3/2011 | Rae |

(Continued)

*Primary Examiner* — Stella L. Woo
(74) *Attorney, Agent, or Firm* — Scheinberg & Associates, P.C.; John B. Kelly; Michael O. Scheinberg

(57) ABSTRACT

Embodiments of the present invention are directed to a method and system for providing a visual indication that a video relay service (VRS) call originates from an inmate at a corrections facility, in which the method includes initiating a video relay service (VRS) call from a corrections facility between a called party and an inmate incarcerated at the corrections facility; and displaying a visual indication on a VRS client used by the called party, the visual indication including at least one of a visual indication that the VRS call is originating from a corrections facility, a visual indication that the VRS call is from an inmate incarcerated at a corrections facility, and a visual indication that the VRS call is being recorded.

60 Claims, 2 Drawing Sheets

(56) References Cited

U.S. PATENT DOCUMENTS

| | | |
|---|---|---|
| 8,010,706 B1 | 8/2011 | Rein et al. |
| 8,204,179 B2 | 6/2012 | Goldman et al. |
| 8,345,827 B2 | 1/2013 | Liebermann et al. |
| 8,374,325 B2 | 2/2013 | Robotka |
| 8,528,068 B1 | 9/2013 | Weglein et al. |
| 8,739,234 B1 | 5/2014 | Cheung et al. |
| 8,817,966 B2 | 8/2014 | Wrench |
| 9,106,789 B1 | 8/2015 | Shipman et al. |
| 9,247,200 B2 | 1/2016 | Gupta et al. |
| 9,330,088 B2 | 5/2016 | Fitterer et al. |
| 9,344,674 B2 | 5/2016 | Talbot |
| 9,558,523 B1 | 1/2017 | Hodge |
| 9,615,060 B1 | 4/2017 | Hodge |
| 9,628,620 B1 | 4/2017 | Rae et al. |
| 9,667,763 B1 | 5/2017 | Keiser et al. |
| 9,794,399 B1 | 10/2017 | Hodge |
| 10,129,505 B2 * | 11/2018 | Talbot .................... H04N 7/152 |
| 2003/0069997 A1 | 4/2003 | Bravin et al. |
| 2005/0086699 A1 | 4/2005 | Hahn et al. |
| 2005/0129185 A1 | 6/2005 | McClelland et al. |
| 2005/0238143 A1 | 10/2005 | Clapp et al. |
| 2006/0026001 A1 | 2/2006 | Bravin et al. |
| 2006/0074624 A1 | 4/2006 | Sahashi |
| 2006/0285652 A1 | 12/2006 | McClelland et al. |
| 2007/0041545 A1 * | 2/2007 | Gainsboro ......... H04M 3/2281 379/188 |
| 2008/0219422 A1 * | 9/2008 | Polozola ................ G06Q 30/02 379/127.02 |
| 2009/0028300 A1 * | 1/2009 | McLaughlin ..... H04M 3/42391 379/52 |
| 2009/0174759 A1 | 7/2009 | Yeh et al. |
| 2009/0262906 A1 | 10/2009 | Goldman et al. |
| 2010/0027765 A1 * | 2/2010 | Schultz ............ H04M 3/42391 379/52 |
| 2010/0066803 A1 | 3/2010 | Robotka |
| 2011/0261941 A1 | 10/2011 | Walters et al. |
| 2012/0176466 A1 | 7/2012 | Wrench |
| 2012/0196580 A1 * | 8/2012 | Simmons ................ H04M 1/57 455/415 |
| 2012/0224678 A1 | 9/2012 | Walters et al. |
| 2013/0194377 A1 * | 8/2013 | Humphries .............. H04N 7/15 348/14.08 |
| 2014/0267540 A1 * | 9/2014 | Torgersrud ............ H04N 7/147 348/14.01 |
| 2015/0022616 A1 | 1/2015 | Talbot |
| 2015/0271444 A1 | 9/2015 | DeFazio et al. |
| 2015/0319612 A1 * | 11/2015 | Hodge ................ H04L 63/0861 455/411 |
| 2016/0198121 A1 * | 7/2016 | Walker ............... H04L 65/1089 348/14.01 |
| 2016/0212259 A1 | 7/2016 | Higgs |
| 2017/0017876 A1 | 1/2017 | Modha |
| 2017/0034479 A1 | 2/2017 | Thelin et al. |
| 2017/0280100 A1 | 9/2017 | Hodge |
| 2017/0318143 A1 * | 11/2017 | Hodge .................. H04B 11/00 |
| 2018/0013886 A1 | 1/2018 | Rae et al. |

* cited by examiner

METHOD AND SYSTEM FOR PROVIDING A VISUAL INDICATION THAT A VIDEO RELAY SERVICE CALL ORIGINATES FROM AN INMATE AT A CORRECTIONS FACILITY

This application is a continuation of U.S. patent application Ser. No. 15/795,183 filed on Oct. 26, 2017, which claims priority from U.S. Provisional Patent Application No. 62/413,972, filed on Oct. 27, 2016, which is hereby incorporated by reference.

TECHNICAL FIELD OF THE INVENTION

The present invention relates to telecommunications services for callers who are deaf, hard-of-hearing, or speech impaired, and in particular to video relay service (VRS).

BACKGROUND OF THE INVENTION

Traditional telephony presents a problem for persons who are who are deaf, hard of hearing, or speech-impaired (D-HOH-SI). Communication by telephone requires each party to a telephone call to be able to hear and/or speak to the other party on the call to communicate. For hearing or speech impaired persons, audio communication is difficult or impossible, making telephone communication difficult or impossible.

Early approaches to facilitating telecommunications for D-HOH-SI persons included text-based telecommunications relay service (TRS). Text-based TRS services allow a D-HOH-SI person to communicate with other people over an existing telecommunications network using devices capable of transmitting and receiving text characters over the telecommunications network. Such devices include the telecommunications device for the deaf (TDD) and the teletypewriter (TTY). Text-based TRS services were well-suited to the bandwidth limitations of subscriber lines of the time. The bandwidth limitations of subscriber lines were also a limiting factor in the widespread use of video telephony.

The availability of affordable, high-speed packet-switched communications has led to the growth in the use of video relay services (VRS) by D-HOH-SI persons. Using VRS equipment, D-HOH-SI persons can place video calls to communicate between themselves and with hearing individuals using sign language. VRS equipment enables D-HOH-SI persons to talk to hearing individuals via a sign language interpreter, who uses a conventional telephone at the same time to communicate with the party or parties with whom the D-HOH-SI person wants to communicate. The interpretation flow is normally within the same principal language, such as American Sign Language (ASL) to spoken English or spoken Spanish.

VRS calls present a unique set of issues in a corrections environment (e.g., prison, juvenile detention center, etc.). In the hearing world of telephones, when an inmate of a corrections facility makes a telephone call there is an auditory warning to the called party that says the call is from an inmate (for example, in case Caller ID is disabled or not sufficient). The called party is presented with the options to press 1 to accept the call or to press 2 to disconnect the call before the inmate is connected with the called party. In a VRS video terminal used by non-hearing persons there is no dual tone multi-frequency (DTMF) mechanism to provide a touch tone menu option to disconnect the call before the inmate is connected with the called party. Also, playing an audio message that the call is from an inmate cannot be used because the non-hearing party can't hear the audio message that the call is from an inmate. Also, there isn't any DTMF recognition in a VRS call, so there is no touch tone recognition to interrogate and respond like there is in the telephone world.

Another problem in the prior it is the scenario where an inmate in the federal prison is deaf, applies to make a call to a person who is not incarcerated, a spouse for example. The corrections facility approves the inmate's application to call the number. The spouse accepts the calls and then later in their relationship the spouse decides that she no longer wants to accept the calls from inmate. After her number has been approved to be called from the inmate, she no longer wishes to receive those calls but the bureaucratic process of preventing those calls by that inmate can take weeks to be processed.

SUMMARY OF THE INVENTION

Embodiments of the present invention are directed to a method for providing a visual indication that a video relay service (VRS) call originates from an inmate at a corrections facility, in which the method includes initiating a video relay service (VRS) call from a corrections facility between a called party and an inmate incarcerated at the corrections facility; and displaying a visual indication on a VRS client used by the called party, the visual indication including at least one of: a visual indication that the VRS call is originating from a corrections facility, a visual indication that the VRS call is from an inmate incarcerated at a corrections facility, and a visual indication that the VRS call is being recorded.

Embodiments of the present invention are directed to a video relay service (VRS) system for providing a visual indication that a video relay service (VRS) call originates from an inmate at a corrections facility. The system can comprise one or more video relay service clients adapted and programmed to perform the steps of initiating a video relay service (VRS) call from a corrections facility between a called party and an inmate incarcerated at the corrections facility; and displaying a visual indication on a VRS client used by the called party, the visual indication including at least one of: a visual indication that the VRS call is originating from a corrections facility, a visual indication that the VRS call is from an inmate incarcerated at a corrections facility, and a visual indication that the VRS call is being recorded.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Figure 1:
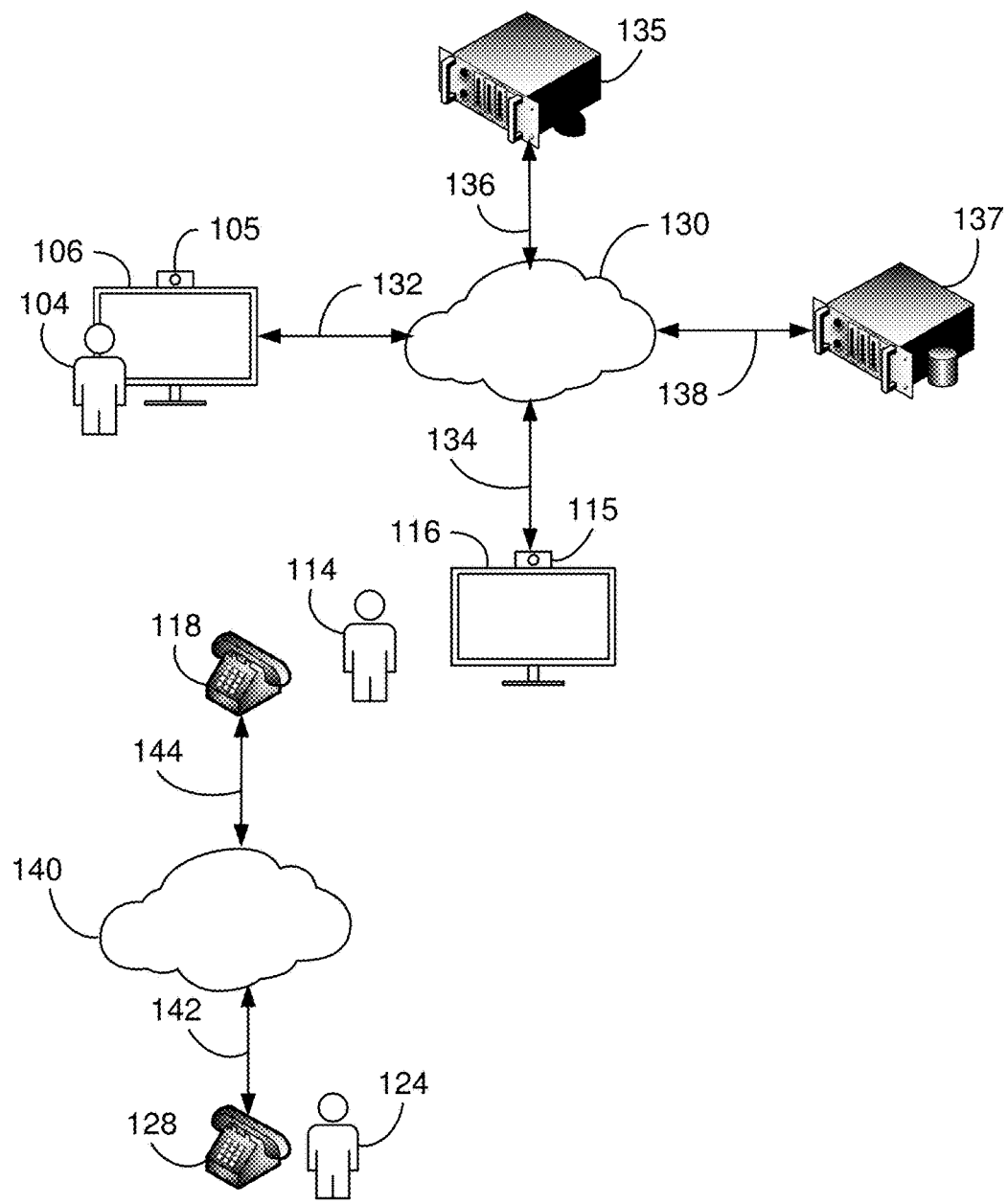
FIG. 1 is a schematic diagram showing a video relay service (VRS) system in accordance with embodiments of the present invention.

Embodiments of the present invention are directed to a method and system for providing a visual indication that a video relay service (VRS) call originates from an inmate at a corrections facility. When an inmate at a corrections facility places a VRS call, the called party receives a notification of an incoming call on the called party's VRS system. For a predetermined duration (e.g., 15 seconds, 1 minute, any duration), a visual indication is displayed that indicates the incoming call originates from an inmate at a corrections facility. The visual indication can be a string of characters forming a text-based message. The visual indication can be static image. The visual indication can also comprise the playing of a video. The visual indication can comprise any means of displaying in a VRS call a visual warning on the screen of the called party indicating that the call is from an inmate of a corrections facility. The visual indication can include an indication of the identity of the inmate. The visual indication can include the identity of the corrections facility. For example, the visual indication can comprise a video in American Sign Language that says the call is from an inmate and tells the called party exactly how long the called party has to accept the call. A static image can be displayed with text within the image that says the call is from an inmate and the called party has, for example, 15 seconds to disconnect before the call is connected. The medium that is displayed on the called party's screen can include, but is not limited to, a video stream, a joint photographic experts group (JPEG) static image, a portable network graphics (PNG) static image, or whatever format affords the called party an opportunity to disconnect. In one embodiment, if the called party does not wish to accept the call, the called party can select an option to disconnect the call immediately without ever seeing the inmate. In some embodiments, if the called party does not wish to accept the call, the called party can select an option to disconnect the call immediately without ever seeing the inmate. In other embodiments, if the called party does not wish to accept the call, the called party can select an option to disconnect the call immediately without the inmate ever seeing the called party. In other embodiments, if the called party does not wish to accept the call, the called party can select an option to disconnect the call immediately without the inmate ever seeing the called party and without the called party ever seeing the inmate.

In one embodiment, a flag in a call manager identifies the calling party as an inmate. The call manager only presents the visual indication to the called party if the calling party is an inmate. So, in the case of an employee who is hearing impaired and using the system to make a call out of the corrections facility, then the call manager can turn that warning off for the employee who is using the same system. The visual indication that the call was originated by an inmate is disabled. The opportunity to disconnect prior to accepting the call can also be disabled.

The visual indication can be a user-selectable option to play a video should or a static image that contains text. The static image can be similar to a broadcast television test pattern where a static image is displayed instead of a video. The videos, the .png or the jpeg image file that are presented can be customized. The visual indication can be customized according to user preference. The user can be a security administrator of a corrections facility responsible for inmate communications. For a period of time, selectable by the user, the called party is notified in some form that is in a video on their screen. On the screen, an image is displayed that warns the called party that this call is from an inmate. The image can be a static video image or a playing video file, such as a video in American Sign Language (ASL). A static video image can be used for a person who can read. A video can be used for person can't read, but who may understand ASL. So the system can play an actual video in ASL that warns the called party that the call is from an inmate.

FIG. 1 is a schematic diagram showing a video relay service (VRS) system with automated call recording in accordance with embodiments of the present invention. User 104 is located in proximity to VRS client 105 so that user 104 can interact with VRS client 105. User 104 is preferably a person who is deaf (D), hard-of-hearing (HOH), speech-impaired (SI), or any other person who communicates via sign language. User 104 can be an inmate in a corrections environment (e.g., prison, juvenile detention center, etc.). User 104 interacts with VRS client 105 by viewing video on display 106. Display 106 is any device suitable for displaying to user 104 a video signal of a sign language interpreter, such as sign language interpreter 114, in sufficient quality so that a person fluent in sign language can comprehend the sign language interpreter. VRS client 105 includes a video capture device suitable for capturing a video signal of user 104 within the field-of-view of the camera at sufficient quality and frame rate to support sign language communication with sign language interpreter 114. VRS client 105 also includes hardware and/or software to, substantially in real-time, convert the captured video signal into a data stream suitable for transmission over packet-switched network 130, such as an internet protocol (IP) network, over network link 132. VRS client 106 also includes hardware and/or software to transmit the data stream over packet-switched network 130 at sufficient network speed so that a remote VRS client, such as VRS client 115, can display the data stream as video on a display device, such as display 116, in sufficient quality for sign language interpreter 114 to comprehend sign language in the displayed video. VRS client 105 can also include hardware and/or software to, substantially in real-time, receive a data stream from a remote VRS terminal, such as VRS terminal 115, from packet-switched network 130 over network link 132, convert the data stream into a suitable video signal, and output the video signal to display 106. In a corrections environment, VRS client 105 can be located at the facility where user 104 is incarcerated to that user 104 can communicate with persons who are not located at the facility, such as family, an attorney, or clergy. VRS client 105 can apply video watermarks to the VRS call. The video watermarks can include a visual indication that informs one or more parties to the call that the call is being recorded. The video watermarks can include a time and/or date indication. The video watermarks can include an identification associated with one or more of the parties to the call, such as an inmate identification number and/or an identification of the corrections facility.

Signaling over packet-switched network 130 is preferably implemented using session initiation protocol (SIP). Alternatively, signaling over packet-switched network 130 is implemented using the H.323 standard from the International Telecommunication Union Telecommunication Standardization Sector (ITU-T). Those skilled in the art will recognize that any signaling means suitable for transmitting and receiving video substantially in real-time is within the scope of the present invention.

In a preferred embodiment, display 106 can be a high definition flat panel display with digital inputs, such as digital visual interface (DVI) or high-definition multimedia interface (HDMI) connectors. VRS client 105 can include digital outputs, such as digital visual interface (DVI) or high-definition multimedia interface (HDMI) connectors. VRS client 105 can connect to display 106 via compatible cabling, as is known in the art. User 104 can operate VRS client 105 by a remote input device, such as an infrared (IR), radio frequency (RF), or Bluetooth® handheld remote. VRS client 105 can include a digital video camera assembly mounted to the front-facing (i.e., user-facing) panel. The digital video camera can include an active pixel sensor, such as a complementary metal oxide semiconductor (CMOS) sensor or a charged coupled device (CCD) sensor. VRS client 105 can include a network interface for establishing network link 132 with packet-switched network 130, such as Ethernet support and a wired an RJ-45 connector and/or IEEE 802.11 "Wi-Fi" connectivity. VRS client 105 can include one or more universal serial bus (USB) connectors for connecting USB devices, such as flash accessory that can be used to alert a D-HOH user that an incoming call is waiting to be answered. VRS client 105 can also include an interface for flash storage media, such as a Secure Digital (SD) non-volatile memory card. VRS client 105 can include a clamp that can be used to fasten VRS terminal 105 to display 106 in so that the camera faces user 104 as user 104 views display 106. The clamp can be opened to be alternatively used as a desktop stand.

While the foregoing describes a preferred embodiment of the present invention, one skilled in the art will appreciate that various changes, substitutions and alterations can be made without departing from the scope of the invention. For example, a single device having an integrated VRS client 105, 115 and display 106, 116 is within the scope of the present invention. Moreover, VRS client 105, 115 can be implemented as software executing on a general purpose computer meeting the hardware requirements for video telephony over IP networks and programmed with software to perform the functions of VRS client 105, 115 and display 106, 116 as disclosed herein is within the scope of the present invention. Such general purpose computers include desktop personal computers (PC), laptop computers, tablet computers, smartphones, etc. Portable devices such as smartphones and tablets having front-facing cameras and IP data connectivity can be particularly useful in helping D-HOH-SI persons communicate with hearing persons via VRS service due to the mobility of the portable devices.

Returning to FIG. 1, VRS client 115 can be operated by the VRS service provider. Sign language interpreter 114 is located in such a way that interpreter 114 can interact with VRS client 115. While only one sign language interpreter 114 and one VRS client 115 is shown, one skilled in the art will understand that a VRS service provider may comprise a large enterprise including hundreds of sign language interpreters (or more) and sufficient service side equipment to provide around the clock VRS service to a large number of users.

Interpreter 114 is preferably a person who can communicate via sign language and is proficient at sign language translation. Display 116 can be any device suitable for displaying to interpreter 114 the video signal of a user 104 in sufficient quality so that interpreter 114 can comprehend the sign language from user 104. VRS client 115 can include a video capture device suitable for capturing a video signal of interpreter 114 within the field-of-view of the camera at sufficient quality and frame rate to support sign language communication with user 104. VRS client 115 can also include hardware and/or software to, substantially in real-time, convert the captured video signal into a data stream suitable for transmission over packet-switched network 130, such as an internet protocol (IP) network, over network link 134. VRS client 105 can also include hardware and/or software to transmit the data stream over packet-switched network 130 at sufficient network speed so that VRS client 105 can display the data stream as video on display device 106 in sufficient quality for user 104 to comprehend sign language in the displayed video. VRS client 115 can also include hardware and/or software to, substantially in real-time, receive a data stream from VRS client 105 from packet-switched network 130 over network link 134, convert the data stream into a suitable video signal, and output the video signal to display 116.

Service side equipment can also include traditional public switched telephone network equipment (PSTN), shown in FIG. 1 as telephone 118. While a simple telephone 118 is shown, one skilled in the art would understand that any type of equipment for making and receiving PSTN calls is within the scope of the present invention, including complex enterprise-level telephone systems, computers adapted for placing telephone calls, and cellular telephones. Telephone 118 is connected to the public switched telephone network (PSTN) 140 by network link 144 and is capable of making and receiving traditional circuit switched telephone calls to PSTN telephone numbers.

Hearing person 124 can be a person who has the ability to communicate over PSTN 140 using at least one spoken language via telephone 128. Telephone 128 is connected to the public switched telephone network (PSTN) 140 by network link 142 and is capable of making and receiving traditional circuit switched telephone calls to PSTN telephone numbers. While a simple telephone 128 is shown, one skilled in the art would understand that any type of equipment for making and receiving PSTN calls is within the scope of the present invention, including complex enterprise-level telephone systems, computers adapted for placing telephone calls, and cellular telephones.

Rules gateway 135 is connected to packet-switched network 130 over network link 136. Rules gateway 135 can be located in the corrections environment where user 104 is located. Rules gateway 135 can be included in service side equipment located at a facility operated by the VRS service provider. Rules gateway 135 can be implemented as a software-as-a-service (SaaS) web service hosted in cloud networking system and accessible by way of packet-switched network 130. Rules gateway 135 can be used to determine whether a VRS call in a corrections environment is to be recorded. Rules gateway 135 can be used to modify VRS call properties for recording. The operation of rules gateway 135 is explained in further detail with respect to FIG. 2.

Recorder 137 is a device that is capable of recording a VRS call, including audio, video, and any watermarks applied to the call. Recorder 137 can be connected to packet-switched network 130 over network link 138. Recorder 137 can be located in the corrections environment where user 104 is located. Recorder 137 can be included in service side equipment located at a facility operated by the VRS service provider. Recorder 137 can be implemented as a software-as-a-service (SaaS) web service hosted in cloud networking system and accessible by way of packet-switched network 130. Recorder 137 can be programmed to automatically record a VRS call based on call properties associated with the VRS call. The call properties can be modified by the VRS client 105 in response to an instruction from rules gateway 135. The operation of recorder 137 is explained in further detail with respect to FIG. 2.

Rules gateway 135, recorder 137, VRS client 105, and VRS client 115 can be implemented as separate and distinct systems that operate independent of location and communicate with each other by way of the Internet. Alternatively, one or more of rules gateway 135, recorder 137, VRS client 105, and VRS client 115 can be combined to suit a particular application. For example, VRS client 105, rules gateway 135, and recorder 137 can be integrated into one device for installation at a corrections facility that maintains its own recordings on-site. More than one device can also be provided for redundancy. For example, a recorder can be installed at a corrections facility and a recorder can be installed at the service provider, each recorder separately recording the VRS call in case one recorder fails.

User 104 initiates a VRS video call with Interpreter 114. Interpreter 114 then uses telephone 118 to call hearing person 124 on behalf of user 104. The call to hearing person 124 may be placed automatically by service side equipment. Interpreter 114 and user 104 communicate using sign language via VRS client 105 and VRS client 115. Interpreter 114 and hearing person 124 communicate using spoken language via telephone 118 and telephone 128. In this way, interpreter 114 acts as an intermediary between user 104 and hearing person 124, interpreting the communication between user 104 and hearing person 124.

Figure 2:
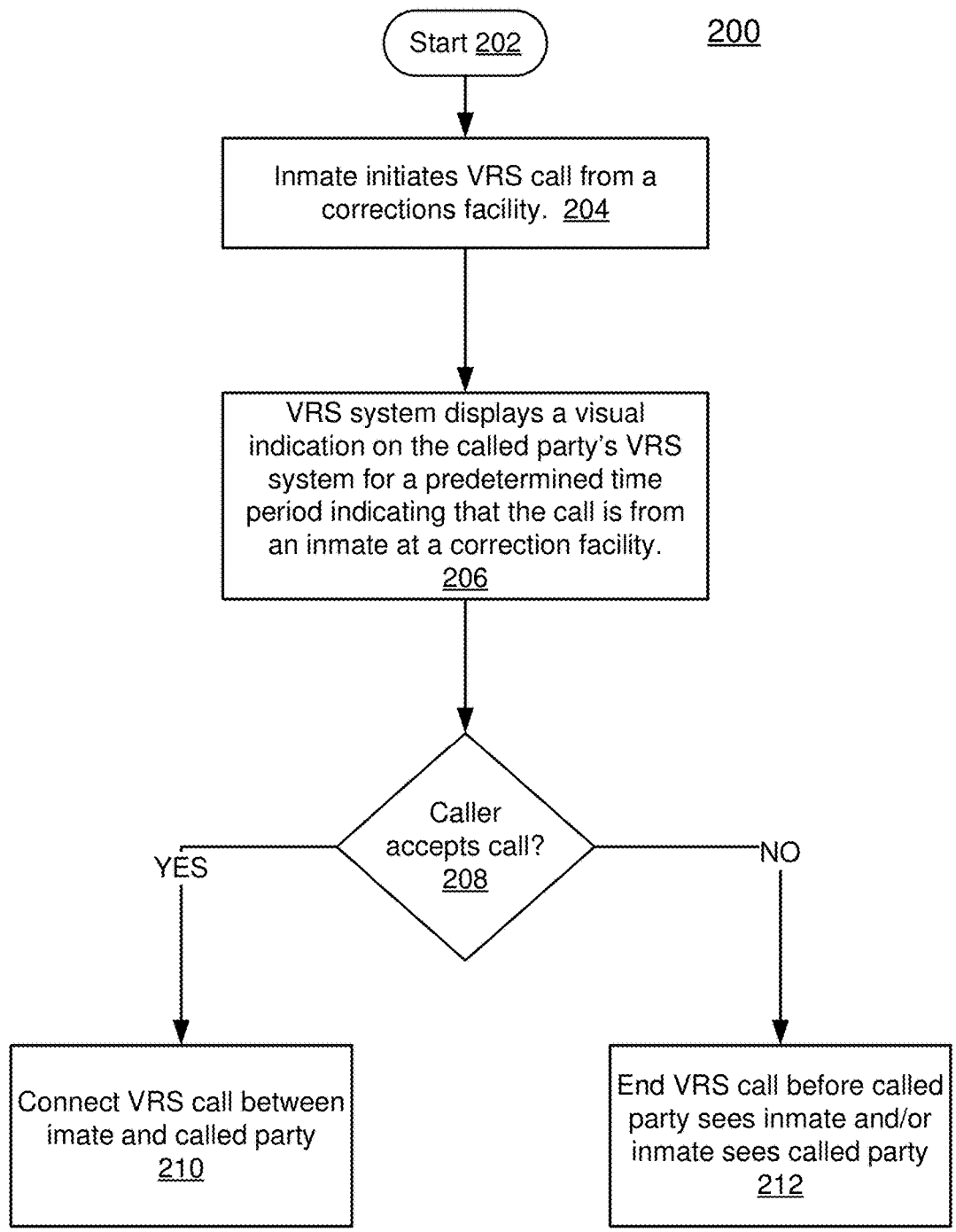
FIG. 2 is a flowchart showing a method for providing a visual indication that a video relay service (VRS) call originates from an inmate at a corrections facility according to embodiments of the present invention.

FIG. 2 is a flowchart showing a method for providing a visual indication that a video relay service (VRS) call originates from an inmate at a corrections facility according to embodiments of the present invention. At step 204, an inmate initiates a VRS call from VRS system at a corrections facility, for example by means of session initiation protocol (SIP). At step 206, VRS system displays a visual indication on the called party's VRS system for a predetermined time period indicating that the call is from an inmate at a correction facility. At step 208, the VRS system determined whether the called party answers the call within the predetermined time period. If the called party accepts the call within the predetermined time period, the VRS call is connected between the inmate and the called party (step 210). If the called party does not accept the call within the predetermined time period, the VRS call is ended before the inmate sees the called party (step 212).

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A method for providing a visual indication that a video relay service (VRS) call originates from an incarcerated inmate, the method comprising:
    connecting a video relay service (VRS) call between a called party and an incarcerated inmate;
    displaying a visual indication on a VRS client used by the called party;
    wherein the visual indication includes a string of characters forming a text-based message including a visual warning that the call is from an incarcerated inmate or originating from a corrections facility.

2. The method of claim 1 further comprising:
    receiving an input from the called party, the input indicating whether the called party wishes to proceed with the VRS call from the incarcerated inmate;
    in response to the input indicating that the called party wishes to proceed with the VRS call from the incarcerated inmate, allowing the video content of the VRS call to be conveyed between the called party and the incarcerated inmate; and
    in response to the input indicating that the called party does not accept the VRS call from the incarcerated inmate, terminating the VRS call.

3. The method of claim 2, in which, in response to the input indicating that the called party does not accept the VRS call from the incarcerated inmate, the VRS call is terminated.

4. The method of claim 1, in which the visual indication is automatically displayed on the VRS client based on a flag associated with the incarcerated inmate that identifies the incarcerated inmate as a calling party.

5. The method of claim 1, in which the visual indication includes a sign language video.

6. The method of claim 1, in which the visual indication includes a video of a static image.

7. The method of claim 1 further comprising, in response to receiving no input within a predetermined period of time from the called party indicating whether the called party wishes to proceed with the VRS call from the incarcerated inmate, allowing the video content of the VRS call to be conveyed between the called party and the incarcerated inmate.

8. The method of claim 1 further comprising, in response to receiving no input within a predetermined period of time from the called party, disconnecting the VRS call between the called party and the incarcerated inmate.

9. The method of claim 1 further comprising, after the VRS call is connected, displaying the visual indication as a video watermark for the duration of the VRS call.

10. The system of claim 1 wherein the visual indication includes a visual warning that the call is being recorded.

11. A video relay service (VRS) system for providing a visual indication that a video relay service (VRS) call originates from an incarcerated inmate, the system comprising one or more video relay service clients adapted and programmed to perform the steps of:
    connecting a video relay service (VRS) call between a called party and an incarcerated inmate;
    displaying a visual indication on a VRS client used by the called party;
    wherein the visual indication includes a string of characters forming a text-based message including a visual warning that the call is from an incarcerated inmate or originating from a corrections facility.

12. The system of claim 11, further comprising:
receiving an input from the called party, the input indicating whether the called party wishes to proceed with the VRS call from the incarcerated inmate;
in response to the input indicating that the called party wishes to proceed with the VRS call from the incarcerated inmate, allowing the video content of the VRS call to be conveyed between the called party and the incarcerated inmate; and
in response to the input indicating that the called party does not accept the VRS call from the incarcerated inmate, terminating the VRS call.

13. The system of claim 12, in which, in response to the input indicating that the called party does not accept the VRS call from the incarcerated inmate, the VRS call is terminated.

14. The system of claim 11, in which the visual indication is automatically displayed on the VRS client based on a flag associated with the inmate that identifies the incarcerated inmate as a calling party.

15. The system of claim 11, in which the visual indication includes a sign language video.

16. The system of claim 11, in which the visual indication includes a video of a static image.

17. The system of claim 11, further programmed for, in response to receiving no input within a predetermined period of time from the called party indicating whether the called party wishes to proceed with the VRS call from the incarcerated inmate, allowing the video content the VRS call to be conveyed between the called party and the incarcerated inmate.

18. The system of claim 11, further programmed for, in response to receiving no input within a predetermined period of time from the called party, disconnecting the VRS call between the called party and the incarcerated inmate.

19. The system of claim 11 further programmed for, after the VRS call is connected, displaying the visual indication as a video watermark for the duration of the VRS call.

20. The method of claim 11 wherein the visual indication includes a visual warning that the call is being recorded.

21. A method for providing a visual indication that a video relay service (VRS) call originates from an incarcerated inmate, the method comprising:
connecting a video relay service (VRS) call between a called party and an incarcerated inmate;
displaying a visual indication on a VRS client used by the called party;
wherein the visual indication includes a static image including a visual warning that the call is from an incarcerated inmate or originating from a corrections facility.

22. The method of claim 21 further comprising:
receiving an input from the called party, the input indicating whether the called party wishes to proceed with the VRS call from the incarcerated inmate;
in response to the input indicating that the called party wishes to proceed with the VRS call from the incarcerated inmate, allowing the video content of the VRS call to be conveyed between the called party and the incarcerated inmate; and
in response to the input indicating that the called party does not accept the VRS call from the incarcerated inmate, terminating the VRS call.

23. The method of claim 22, in which, in response to the input indicating that the called party does not accept the VRS call from the incarcerated inmate, the VRS call is terminated.

24. The method of claim 21, in which the visual indication is automatically displayed on the VRS client based on a flag associated with the incarcerated inmate that identifies the incarcerated inmate as a calling party.

25. The method of claim 21, in which the visual indication includes a sign language video.

26. The method of claim 21, in which the visual indication includes a video of a static image.

27. The method of claim 21 further comprising, in response to receiving no input within a predetermined period of time from the called party indicating whether the called party wishes to proceed with the VRS call from the incarcerated inmate, allowing the video content of the VRS call to be conveyed between the called party and the incarcerated inmate.

28. The method of claim 21 further comprising, in response to receiving no input within a predetermined period of time from the called party, disconnecting the VRS call between the called party and the incarcerated inmate.

29. The method of claim 21 further comprising, after the VRS call is connected, displaying the visual indication as a video watermark for the duration of the VRS call.

30. The method of claim 21 wherein the visual indication includes a visual warning that the call is being recorded.

31. A method for providing a visual indication that a video relay service (VRS) call originates from an incarcerated inmate, the method comprising:
connecting a video relay service (VRS) call between a called party and an incarcerated inmate;
displaying a visual indication on a VRS client used by the called party; wherein the visual indication includes a video including a visual warning that the call is from an incarcerated inmate or originating from a corrections facility.

32. The method of claim 31 further comprising: receiving an input from the called party, the input indicating whether the called party wishes to proceed with the VRS call from the incarcerated inmate;
in response to the input indicating that the called party wishes to proceed with the VRS call from the incarcerated inmate, allowing the video content of the VRS call to be conveyed between the called party and the incarcerated inmate; and
in response to the input indicating that the called party does not accept the VRS call from the incarcerated inmate, terminating the VRS call.

33. The method of claim 32, in which, in response to the input indicating that the called party does not accept the VRS call from the incarcerated inmate, the VRS call is terminated.

34. The method of claim 31, in which the visual indication is automatically displayed on the VRS client based on a flag associated with the incarcerated inmate that identifies the incarcerated inmate as a calling party.

35. The method of claim 31, in which the visual indication includes a sign language video.

36. The method of claim 31, in which the visual indication includes a video of a static image.

37. The method of claim 31 further comprising, in response to receiving no input within a predetermined period of time from the called party indicating whether the called party wishes to proceed with the VRS call from the incarcerated inmate, allowing the video content of the VRS call to be conveyed between the called party and the incarcerated inmate.

38. The method of claim 31 further comprising, in response to receiving no input within a predetermined period of time from the called party, disconnecting the VRS call between the called party and the incarcerated inmate.

39. The method of claim 31 further comprising, after the VRS call is connected, displaying the visual indication as a video watermark for the duration of the VRS call.

40. The method of claim 31 wherein the visual indication includes a visual warning that the call is being recorded.

41. A video relay service (VRS) system for providing a visual indication that a video relay service (VRS) call originates from an incarcerated inmate, the system comprising one or more video relay service clients adapted and programmed to perform the steps of:
connecting a video relay service (VRS) call between a called party and an incarcerated inmate;
displaying a visual indication on a VRS client used by the called party;
wherein the visual indication includes a static image including a visual warning that the call is from an incarcerated inmate or originating from a corrections facility.

42. The system of claim 41 further programmed to perform the steps of: receiving an input from the called party, the input indicating whether the called party wishes to proceed with the VRS call from the incarcerated inmate;
in response to the input indicating that the called party wishes to proceed with the VRS call from the incarcerated inmate, allowing the video content of the VRS call to be conveyed between the called party and the incarcerated inmate; and
in response to the input indicating that the called party does not accept the VRS call from the incarcerated inmate, terminating the VRS call.

43. The system of claim 42, in which, in response to the input indicating that the called party does not accept the VRS call from the incarcerated inmate, the VRS call is terminated.

44. The system of claim 41, in which the visual indication is automatically displayed on the VRS client based on a flag associated with the incarcerated inmate that identifies the incarcerated inmate as a calling party.

45. The system of claim 41, in which the visual indication includes a sign language video.

46. The system of claim 41, in which the visual indication includes a video of a static image.

47. The system of claim 41 further programmed to perform the steps of, in response to receiving no input within a predetermined period of time from the called party indicating whether the called party wishes to proceed with the VRS call from the incarcerated inmate, allowing the video content of the VRS call to be conveyed between the called party and the incarcerated inmate.

48. The system of claim 41 further programmed to perform the steps of, in response to receiving no input within a predetermined period of time from the called party, disconnecting the VRS call between the called party and the incarcerated inmate.

49. The system of claim 41 further programmed to perform the steps of, after the VRS call is connected, displaying the visual indication as a video watermark for the duration of the VRS call.

50. The system of claim 41 wherein the visual indication includes a visual warning that the call is being recorded.

51. A video relay service (VRS) system for providing a visual indication that a video relay service (VRS) call originates from an incarcerated inmate, the system comprising one or more video relay service clients adapted and programmed to perform the steps of:
connecting a video relay service (VRS) call between a called party and an incarcerated inmate;
displaying a visual indication on a VRS client used by the called party; wherein the visual indication includes a video including a visual warning that the call is from an incarcerated inmate or originating from a corrections facility.

52. The system of claim 51 further programmed to perform the steps of:
receiving an input from the called party, the input indicating whether the called party wishes to proceed with the VRS call from the incarcerated inmate;
in response to the input indicating that the called party wishes to proceed with the VRS call from the incarcerated inmate, allowing the video content of the VRS call to be conveyed between the called party and the incarcerated inmate; and
in response to the input indicating that the called party does not accept the VRS call from the incarcerated inmate, terminating the VRS call.

53. The system of claim 52, in which, in response to the input indicating that the called party does not accept the VRS call from the incarcerated inmate, the VRS call is terminated.

54. The system of claim 51, in which the visual indication is automatically displayed on the VRS client based on a flag associated with the incarcerated inmate that identifies the incarcerated inmate as a calling party.

55. The system of claim 51, in which the visual indication includes a sign language video.

56. The system of claim 51, in which the visual indication includes a video of a static image.

57. The system of claim 51, further programmed for, in response to receiving no input within a predetermined period of time from the called party indicating whether the called party wishes to proceed with the VRS call from the incarcerated inmate, allowing the video content of the VRS call to be conveyed between the called party and the incarcerated inmate.

58. The system of claim 51, further programmed for, in response to receiving no input within a predetermined period of time from the called party, disconnecting the VRS call between the called party and the incarcerated inmate.

59. The system of claim 51 further programmed for, after the VRS call is connected, displaying the visual indication as a video watermark for the duration of the VRS call.

60. The system of claim 51 wherein the visual indication includes a visual warning that the call is being recorded.

* * * * *